United States Patent [19]
Yamakawa

[11] Patent Number: 5,682,258
[45] Date of Patent: Oct. 28, 1997

[54] F. θ LENS FOR OPTICAL SCANNING SYSTEM

[75] Inventor: Hiromitsu Yamakawa, Omiya, Japan

[73] Assignee: Fuji Photo Optical Co., Ltd., Saitama-ken, Japan

[21] Appl. No.: 693,373

[22] Filed: Aug. 8, 1996

Related U.S. Application Data

[63] Continuation of Ser. No. 314,406, Sep. 27, 1994, abandoned.

[30] Foreign Application Priority Data

Sep. 29, 1993 [JP] Japan ................................ 5-242354

[51] Int. Cl.$^6$ ............................................... G02B 26/08
[52] U.S. Cl. ................................................ 359/206; 359/216
[58] Field of Search ........................... 359/205–206, 359/216–219, 662, 774, 771, 772, 212–215

[56] References Cited

U.S. PATENT DOCUMENTS 5,018,807  5/1991  Shirota ................................. 359/662

FOREIGN PATENT DOCUMENTS

| 58-44410 | 3/1983 | Japan . | |
|---|---|---|---|
| 62-262812 | 11/1987 | Japan | 359/774 |
| 1-66611 | 3/1989 | Japan | 359/774 |
| 3-64724 | 3/1991 | Japan . | |

*Primary Examiner*—James Phan
*Attorney, Agent, or Firm*—Young & Thompson

[57] ABSTRACT

An f·θ lens for an optical scanning system is comprised of four lens elements, arranged in order from the object end to the image end: a first meniscus element of positive power having a concave object side surface, a second element of negative power having a concave object side surface, a third element of positive power having a convex image side surface and a fourth element.

7 Claims, 6 Drawing Sheets

SPHERICAL ABERRATION
F/21

ASTIGMATISM
$\theta = 23.6°$

—— SAGITTAL
- - - TANGENTIAL

DISTORTION
$\theta = 23.6°$

SPHERICAL ABERRATION
F/21

ASTIGMATISM
$\theta = 23.6°$

—— SAGITTAL
- - - TANGENTIAL

DISTORTION
$\theta = 23.6°$

SPHERICAL ABERRATION
F/21

-1.0   1.0(mm)

ASTIGMATISM
$\theta = 22.4°$

——— SAGITTAL
- - - TANGENTIAL

-1.0   1.0(mm)

DISTORTION
$\theta = 22.4°$

-1.0   1.0(%)

SPHERICAL ABERRATION
F/21

-1.0   1.0(mm)

ASTIGMATISM
$\theta = 23.6°$

——— SAGITTAL
- - - TANGENTIAL

-1.0   1.0(mm)

DISTORTION
$\theta = 23.6°$

-1.0   1.0(%)

SPHERICAL
ABERRATION
F/21

ASTIGMATISM
θ = 22.4°

——— SAGITTAL
- - - - TANGENTIAL

DISTORTION
θ = 22.4°

F. θ LENS FOR OPTICAL SCANNING SYSTEM

This application is a continuation of application Ser. No. 08/314,406, filed Sep. 27, 1994, now abandoned.

BACKGROUND OF THE INVENTION

1. Field of the Invention

The resent invention relates to a scanning lens system, such as an f·θ lens system, for scanning a laser beam at a constant speed which is widely used in laser printing and platemaking.

2. Description of Related Art

In the field of laser printing and platemaking equipment industry, optical scanning systems are widely used to scan a laser beam transverse a flat surface of medium. Such an optical system typically uses a rotating polygonal mirror and what is called an f·θ lens.

f·θ lenses of this kind, described in, for instance, Japanese Unexamined Patent Publications Nos. 58 - 44410 and 3 - 64724, comprise four lens elements. As taught in the above-mentioned publications, such an f·θ lens has a high lens speed, i.e. has a high aperture ratio, and exhibits well corrected aberrations.

However, the f·θ lenses described therein, especially if having a long focal length suitable for large image sizes, are large in size. Consequently, they does not satisfy strong demands in the field of optical scanning equipments towards compactness and cheapness nor provides well corrected curvature of field which is essential to high image quality.

SUMMARY OF THE INVENTION

It is an object of the present invention to provide an f·θ lens for optical scanning which enables scanning lens systems to be small in size and provides well corrected curvature of field.

The above object of the present invention is achieved by providing an f·θ lens is comprised four lens elements, namely in order from the object end a first meniscus element of positive power having a concave object side surface, a second element of negative power having a relatively sharp concave object side surface, a third element of positive power having a relatively sharp convex image side surface and a fourth element. This f·θ lens must satisfy the following conditions:

$$-0.5 < f_{23}/f < -0.30$$

$$0.91 < r_2/r_3 < 1.06$$

$$-0.28 < f_2/f < -0.17$$

where f is the focal length of the entire f·θ lens;
$f_2$ = is the focal length of the second element;
$f_{23}$ is the overall focal length of the second and third elements;
$r_2$ is the radius of an image side surface of the first element; and
$r_3$ is the radius of an object side surface of the second element.

The first parameter ($-0.5 < f_{23}/f < -0.30$) defines the overall focal length of the second and third elements. The f·θ lens experiences deterioration in the curvature of field if the upper limit is exceeded and experiences deterioration in astigmatism and is rendered difficult to be made small in size if the lower limit is exceeded, conversely.

The second parameter ($0.91 < r_2/r_3 < 1.06$) defines the ratio between the radius of the image side surface of the first element and the radius of the object side surface of the second element. The f·θ lens experiences deterioration in the curvature of field if the upper limit is exceeded and deterioration in astigmatism if the lower limit is exceeded, conversely.

The third parameter ($-0.28 < f_2/f < -0.17$) defines the ratio of the focal length of the second element to the focal length of the entire f·θ lens. The f·θ lens experiences insufficient correction on spherical aberration and is rendered difficult to provide a beam spot having a critical size for diffraction, consequently, if the upper limit is exceeded and over correction on spherical aberration and is also rendered difficult to provide a beam spot having a critical size for diffraction if the lower limit is exceeded, conversely.

The f·θ lens of the present invention, which satisfies the above conditions (i), (II) and (III), yields favorable correction on both curvature of field and astigmatism and provides a marginal size of beam spot for diffraction. Furthermore, the f·θ lens of the present invention enables it to be configured small in size.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 8:
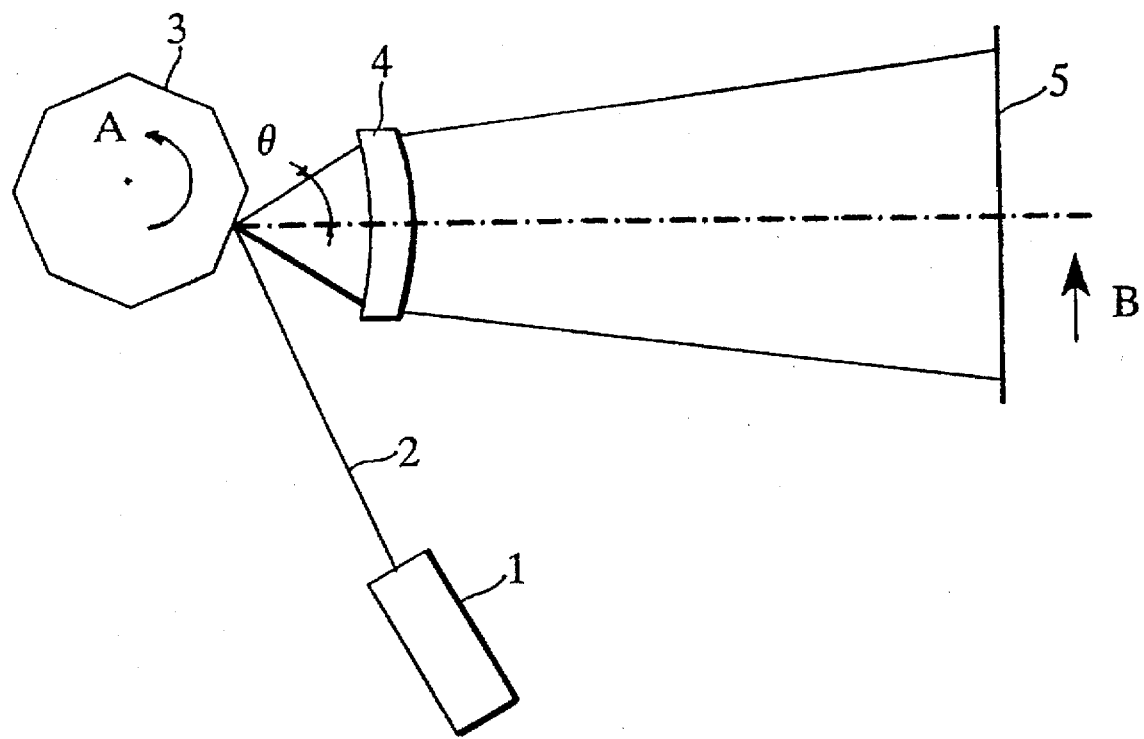
FIG. 8 is a schematic illustration showing an optical scanning system including an f·θ lens.

Referring now to the drawings in detail, and in particular, to FIG. 8, which schematically shows a typical practical arrangement of an optical scanning system of this kind including an f·θ lens of the present invention, a laser source 1 provides a collimated laser beam 2 which impinges upon one or more facets of a polygonal element 3 as a beam scanning means. The rotational axis of the polygonal element is orthogonal to the plane in which the laser beam travels. The facets of the polygonal element 3 are mirrored surfaces suitable for the reflection of laser light impinging upon them. An imaging lens 4, which is well known as an f·θ lens in the art, is positioned at a distance from the leading illuminated facet of the polygonal element 3. The f·θ imaging lens 4 is located in the optical path between the polygonal element 3 and an image-receiving medium 5 so as to focus the reflected laser beam 2 from the polygonal element 3 to a spot on a focal plane in which a flat surface of an medium 5 is placed.

The rotating polygonal element 3 scans in cooperation with the f·θ imaging lens 4 the laser beam 2 linearly transverse the flat surface of medium 5 at a constant speed. When the polygonal element 3 rotates in the counterclockwise direction A as viewed in FIG. 1 on its rotational axis thereof, it scans the spot of laser beam 3 linearly in a transverse direction B from the right to the left as viewed in FIG. 8. The f·θ imaging lens 4 is comprised of four lens elements, as shown in FIG. 1 or 2.

Figure 1:
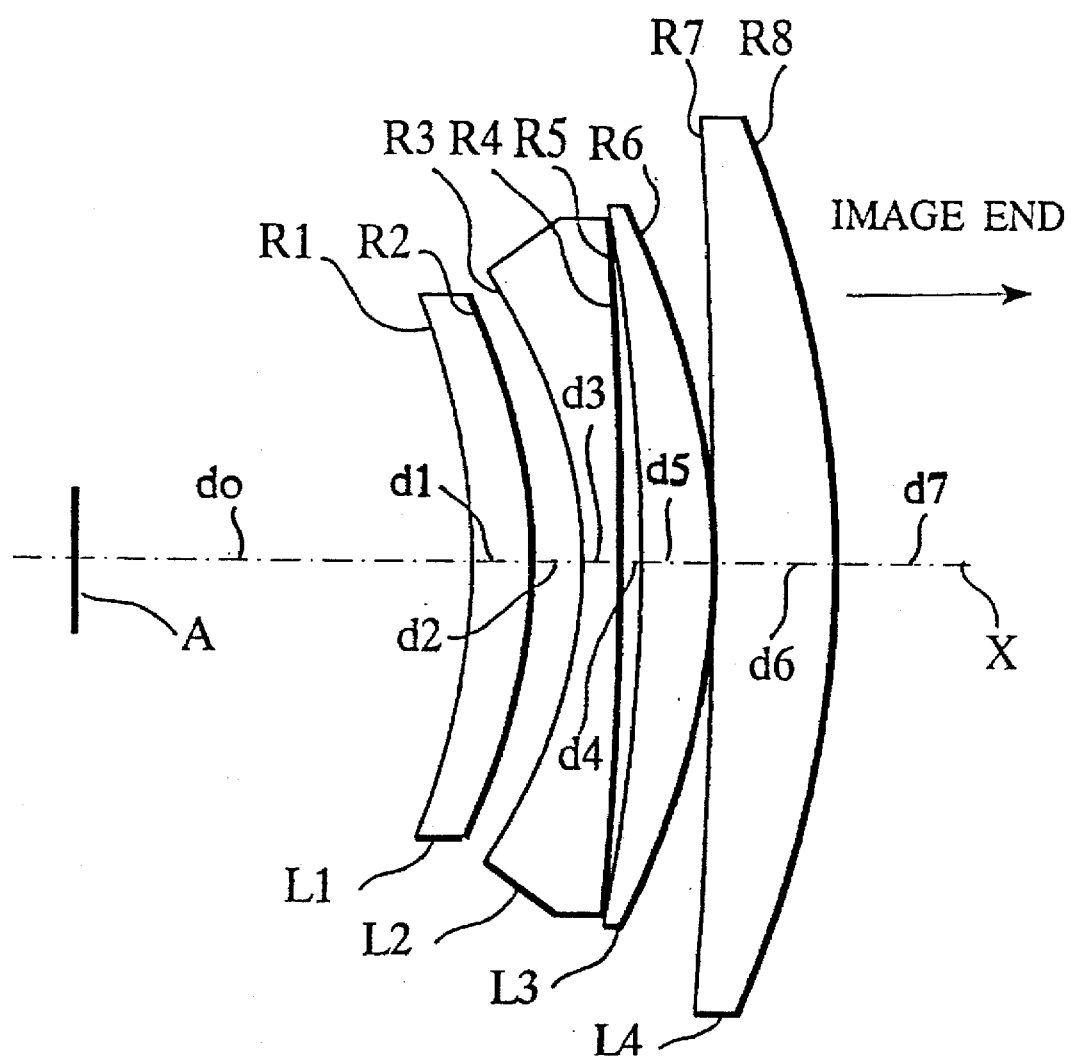
FIG. 1 is a diagrammatic side view of an f·θ lens embodying the present invention which has one of basic optical configurations.
Figure 2:
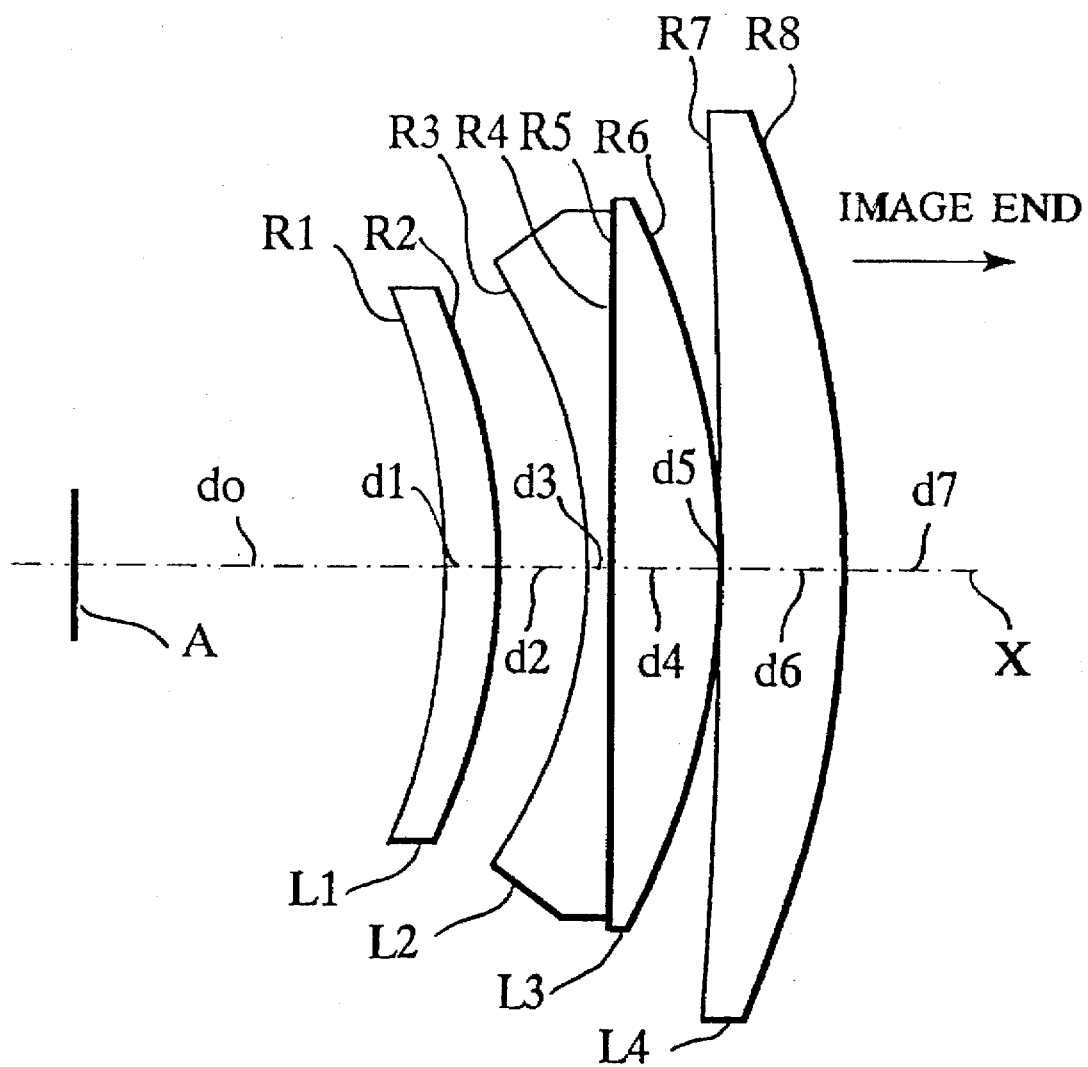
FIG. 2 is a diagrammatic side view of an f·θ lens embodying the present invention which has another basic optical configuration.
Figure 3A:
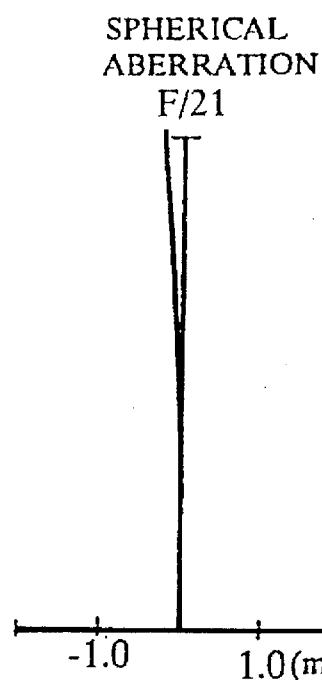
FIGS. 3A–3C are diagrammatic views showing various aberrations of the f·θ lens in accordance with a preferred embodiment of the present invention.
Figure 3B:
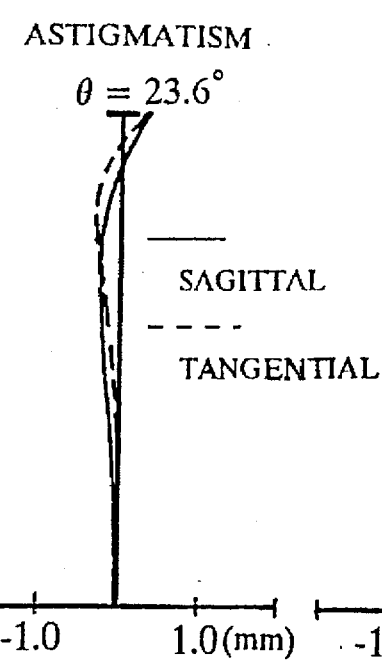
Figure 3C:
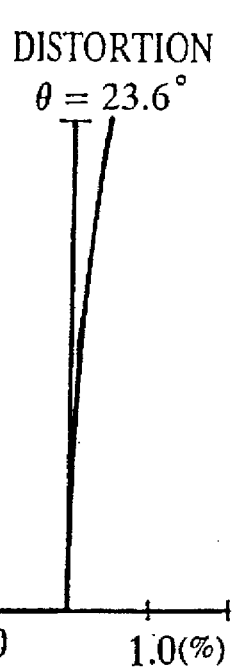
Figure 4A:
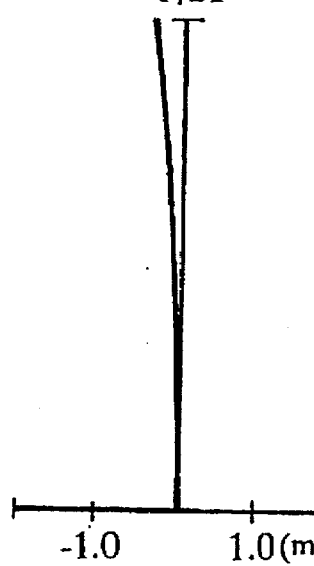
FIGS. 4A–4C are diagrammatic views showing various aberrations of the f·θ lens in accordance with another preferred embodiment of the present invention.
Figure 4B:
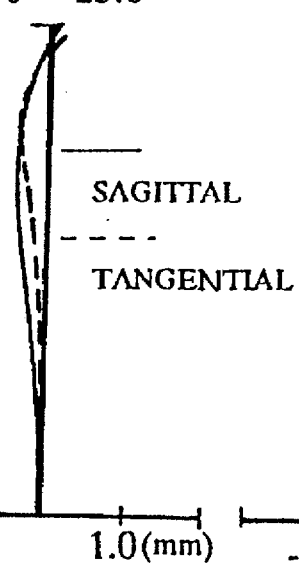
Figure 4C:
Figure 5A:
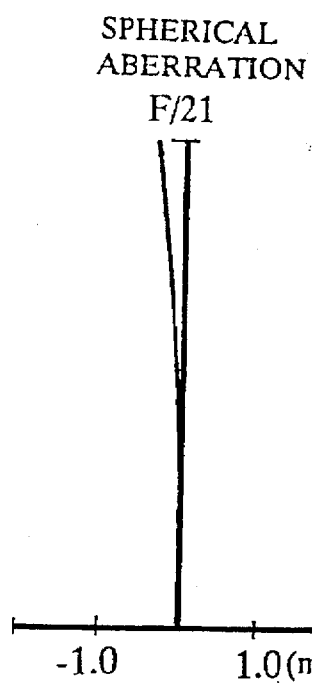
FIGS. 5A–5C are diagrammatic views showing various aberrations of the f·θ lens in accordance with still another preferred embodiment of the present invention.
Figure 5B:
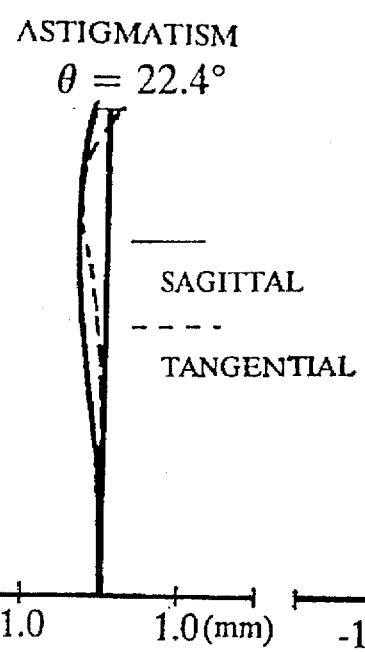
Figure 5C:
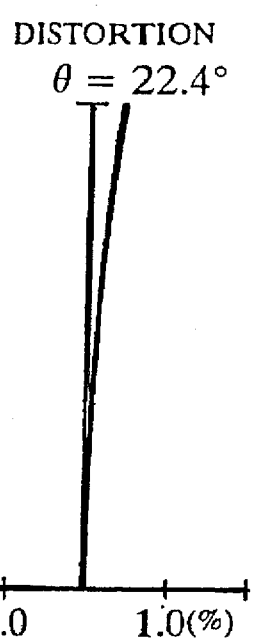
Figure 6A:
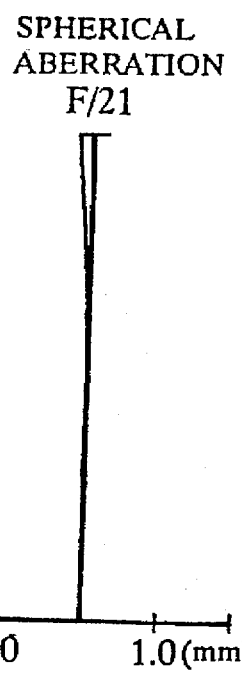
FIGS. 6A–6C are diagrammatic views showing various aberrations of the f·θ lens in accordance with a further preferred embodiment of the present invention.
Figure 6B:
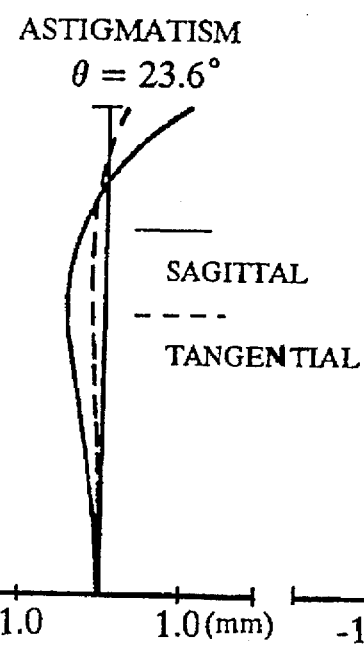
Figure 6C:
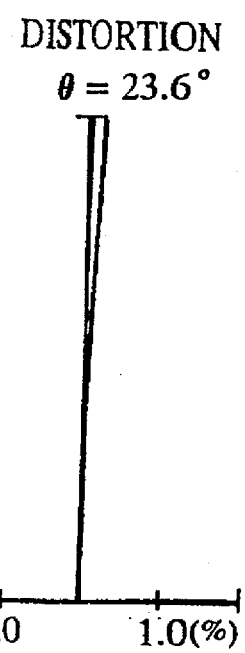
Figure 7A:
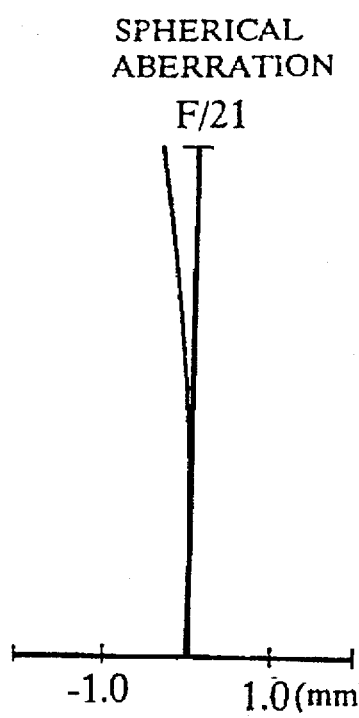
FIGS. 7A–7C are diagrammatic views showing various aberrations of the f·θ lens in accordance with a still further preferred embodiment of the present invention.
Figure 7B:
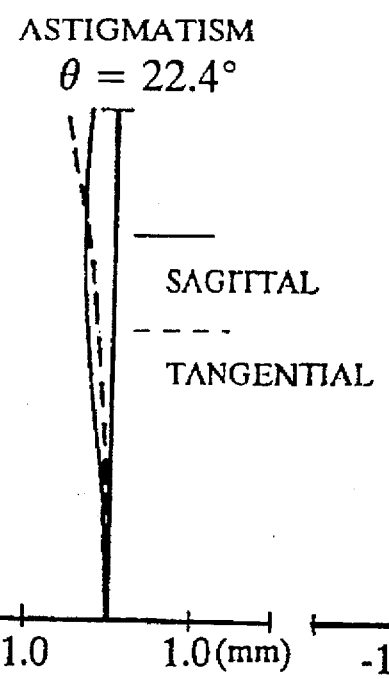
Figure 7C:
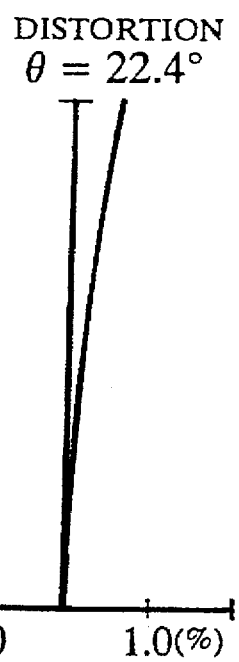

Referring to FIG. 1, which shows one of basic optical configurations of the f·θ imaging lens 4 embodying the present invention, the f·θ imaging lens 4 is comprised of four air spaced lens elements arranged in order from the object end to the image end, namely a first meniscus element L1 of positive power having a concave object side surface, a second element L2 of negative power having a relatively sharp concave object side surface, a third element L3 of positive power having a relatively sharp convex image side surface and a fourth element L4. This f·θ lens satisfies the following conditions:

$$-0.5 < f_{23}/f < -0.30 \quad (I)$$

$$0.91 < r_2/r_3 < 1.06 \quad (II)$$

$$-0.28 < f_2/f < -0.17 \quad (III)$$

$$0.37 < f_3/f < 0.71 \quad (IV)$$

$$0.34 < f_4/f < 0.52 \quad (V)$$

where f is the focal length of the entire f·θ lens;

$f_2$ is the focal length of the second element;

$f_3$ is the focal length of the third element;

$f_4$ is the focal length of the fourth element;

$f_{23}$ is the overall focal length of the second and third elements;

$r_2$ is the radius of an image side surface of the first element; and $r_3$ is the radius of an object side surface of the second element.

The parameters set forth are necessary for suitably balancing the aberration of the f·θ lens. Together, the conditions prevent or significantly reduce aggravation of spherical aberration, the curvature of field and astigmatism. Satisfaction of these parameters ensures a compact f·θ lens and provides a marginal spot size for effective diffraction.

The first parameter ($-0.5 < f_{23}/f < -0.30$), which defines the overall focal length of the second and third elements, yields well corrected aberration necessary for the optical scanning system. The f·θ lens experiences aggravation of the curvature of field if the upper limit is exceeded and experiences aggravation of astigmatism and is rendered difficult to be made compact in size if the lower limit is exceeded, conversely.

The second parameter ($0.91 < r_2/r_3 < 1.06$) defines the ratio between the radius of the image side surface of the first element and the radius of the object side surface of the second element. The f·θ lens experiences aggravation of the curvature of field if the upper limit is exceeded and aggravation o astigmatism if the lower limit is exceeded, conversely.

The third parameter ($-0.28 < f_2/f < -0.17$), which defines the ratio of the focal length of the second element to the focal length of the entire f·θ lens, yields a beam spot reduced to a critical size for effective diffraction. The f·θ lens experiences insufficient correction on spherical aberration if the upper limit is exceeded and over correction on spherical aberration if the lower limit is exceeded. Dissatisfaction of this condition renders it difficult to provide a beam spot reduced to a critical size for effective diffraction.

The fourth parameter ($0.37 < f_3/f < 0.71$), which defines the ratio of the focal length of the third element to the focal length of the entire f·θ lens, yields a beam spot reduced to a critical size for effective diffraction. The f·θ lens experiences over correction on spherical aberration if the upper limit is exceeded and, on the other hand, insufficient correction on spherical aberration if the lower limit is exceeded.

The fifth parameter ($0.34 < f_4/f < 0.52$) defines the ratio of the focal length of the fourth element to the focal length of the entire f·θ lens, provides more compactness of the f·θ lens. The f·θ lens experiences aggravation of astigmatism if the upper limit is exceeded and, on the other hand, aggravation of the curvature of field if the lower limit is exceeded.

Referring to FIG. 2, which shows another basic optical configuration of the f·θ imaging lens 4 embodying the present invention, the f·θ imaging lens 4 is comprised of four lens elements which are basically similar to those shown in FIG. 1, excepting that a second element is a bi-concave lens having a relatively sharp concave object side surface and a third element is a bi-convex lens having a relatively sharp convex image side surface, these second and third elements being cemented together as a double. This f·θ lens satisfies the above conditions (I)~(V).

In the following tables, various embodiments of the invention are set forth. In the following prescription tables, the reference L followed by an arabic numeral indicates the lens element progressively from the object end to the image end of the lens. The reference radius numbers R are the progressive lens surface radii in millimeter (mm). Positive surface radii are struck from the right of the lens surface on the optical axis. Negative surface radii are struck from the left of the lens surface on the optical axis. The reference distance numbers D are the progressive axial distances between adjacent surfaces in millimeter (mm). L is the overall axial length of the f·θ lens in millimeter (mm). θ is the angle of view provided by the f·θ lens. Do is the axial distance from a leading illuminated facet of the polygonal element to the object side surface of the first element L1 in millimeter (mm). N is the index of refraction of the lens element for a spectrum of a wavelength of 632.8 nm.

The following examples in Tables I–IV are exemplary of f·θ lenses according to preferred embodiments of the present invention having the basic optical configuration shown in FIG. 1.

EXAMPLE I

TABLE I

| | Radius of Curvature (mm) | Axial Distance Between Surfaces (mm) | N |
|---|---|---|---|
| L1 | R1 −15.65 | D1 2.042 | 1.77861 |
| | R2 −13.6.72 | | |

TABLE I-continued

| | Radius of Curvature | Axial Distance Between Surfaces | N |
|---|---|---|---|
| | | D2 1.699 | |
| L2 | R3 −13.586 | | |
| | R4 −167.609 | D3 1.497 | 1.73540 |
| | | D4 0.345 | |
| L3 | R5 −88.21 | | |
| | R6 −22.811 | D5 2.993 | 1.51509 |
| | | D6 0.068 | |
| L4 | R7 −247.214 | | |
| | R8 −28.127 | D7 4.082 | 1.77861 |

Parameters

| $f_{23}/f$ | $r_2/r_3$ | $f_2/f$ | $f_3/f$ | $f_4/f$ |
|---|---|---|---|---|
| −0.342 | 1.006 | −0.202 | 0.588 | 0.404 |

| L/f | f | F No. | θ/2 | Do |
|---|---|---|---|---|
| 0.127 | 100 | 21 | 23.6° | 13.078 |

EXAMPLE II

TABLE II

| | Radius of Curvature | Axial Distance Between Surfaces | N |
|---|---|---|---|
| L1 | R1 −15.147 | D1 2.041 | 1.77861 |
| | R2 −13.534 | | |
| | | D2 2.09 | |
| L2 | R3 −13.471 | D3 1.497 | 1.75606 |
| | R4 −171.501 | | |
| | | D4 0.238 | |
| L3 | R5 −95.355 | D5 2.993 | 1.51509 |
| | R6 −21.966 | | |
| | | D6 0.068 | |
| L4 | R7 −222.199 | D7 3.810 | 1.77861 |
| | R8 −26.868 | | |

Parameters

| $f_{23}/f$ | $r_2/r_3$ | $f_2/f$ | $f_3/f$ | $f_4/f$ |
|---|---|---|---|---|
| −0.336 | 1.005 | −0.194 | 0.546 | 0.389 |

| L/f | f | F No. | θ/2 | Do |
|---|---|---|---|---|
| 0.128 | 100 | 21 | 23.6° | 11.506 |

EXAMPLE III

TABLE III

| | Radius of Curvature | Axial Distance Between Surfaces | N |
|---|---|---|---|
| L1 | R1 −14.917 | D1 2.013 | 1.77861 |
| | R2 −13.502 | | |
| | | D2 2.416 | |
| L2 | R3 −13.369 | D3 1.477 | 1.75606 |
| | R4 −166.969 | | |
| | | D4 0.191 | |
| L3 | R5 −101.642 | D5 2.953 | 1.51509 |

TABLE III-continued

| | Radius of Curvature | Axial Distance Between Surfaces | N |
|---|---|---|---|
| | R6 −21.683 | | |
| | | D6 0.067 | |
| L4 | R7 −183.656 | D7 3.739 | 1.77861 |
| | R8 −26.004 | | |

Parameters

| $f_{23}/f$ | $r_2/r_3$ | $f_2/f$ | $f_3/f$ | $f_4/f$ |
|---|---|---|---|---|
| −0.340 | 1.010 | −0.193 | 0.528 | 0.385 |

| L/f | f | F No. | θ/2 | Do |
|---|---|---|---|---|
| 0.129 | 100 | 21 | 22.4° | 11.308 |

EXAMPLE IV

TABLE IV

| | Radius of Curvature | Axial Distance Between Surfaces | N |
|---|---|---|---|
| L1 | R1 −16.249 | D1 2.196 | 1.61824 |
| | R2 −14.524 | | |
| | | D2 2.835 | |
| L2 | R3 −14.721 | D3 2.175 | 1.63604 |
| | R4 −253.662 | | |
| | | D4 0.544 | |
| L3 | R5 −73.844 | D5 3.435 | 1.61824 |
| | R6 −26.140 | | |
| | | D6 0.116 | |
| L4 | R7 −1277.93 | D7 4.082 | 1.61824 |
| | R8 −29.963 | | |

Parameters

| $f_{23}/f$ | $r_2/r_3$ | $f_2/f$ | $f_3/f$ | $f_4/f$ |
|---|---|---|---|---|
| −0.464 | 0.983 | −0.247 | 0.637 | 0.474 |

| L/f | f | F No. | θ/2 | Do |
|---|---|---|---|---|
| 0.154 | 100 | 21 | 23.6° | 10.91 |

The following examples in Table V is exemplary of an f·θ lens according to a preferred embodiment of the present invention having the basic optical configuration shown in FIG. 2.

EXAMPLE V

TABLE V

| | Radius of Curvature | Axial Distance Between Surfaces | N |
|---|---|---|---|
| L1 | R1 −13.931 | D1 2.083 | 1.77861 |
| | R2 −13.001 | | |
| | | D2 2.366 | |
| L2 | R3 −13.503 | D3 1.366 | 1.69426 |
| | R4 −689.93 | | |
| | | D4 0.0 | |
| L3 | R5 −689.93 | D5 3.399 | 1.51509 |
| | R6 −21.826 | | |
| | | D6 0.078 | |

TABLE V-continued

| | | | | |
|---|---|---|---|---|
| L4 | R7 −170.442 | D7 2.934 | | 1.77816 |
| | R8 −28.456 | | | |

| Parameters | | | | |
|---|---|---|---|---|
| $f_{23}/f$ | $r_2/r_3$ | $f_2/f$ | $f_3/f$ | $f_4/f$ |
| −0.410 | 0.983 | −0.191 | 0.411 | 0.435 |
| L/f | f | F No. | θ/2 | Do |
| 0.122 | 100 | 21 | 22.4° | 11.86 |

As apparent from the above tables, all of the f·θ lenses of Tables I–V satisfy the foregoing conditions (I)–(V).

FIGS. 3–7 illustrate various optical characteristics, such as (A) spherical aberration, (B) astigmatism, and (C) distortion, of the f·θ lenses of Tables I–V, respectively.

As seen in FIGS. 3–7, the f·θ lens for an optical scanning system of the present invention are well improved in aberration. This enables the optical scanning system to produce high quality images.

All of the f·θ lenses of Tables I–V have parameters L/f between 0.122 and 0.154. These values are considerably small compared to those of the prior f·θ lenses described in Japanese Unexamined Patent Publications Nos. 58 - 44410 and 3 - 64724, which are in a range between 0.165 and 0.182 and a range between 0.176 and 0.182, respectively. As apparent from the fact, the f·θ lens of the present invention is configured quite compact in overall size and, consequently, contributes to providing compact optical scanning equipments at low cost.

It is to be understood that although the present invention has been described with regard to preferred embodiments thereof, various other embodiments and variants may occur to those skilled in the art, which are within the scope and spirit of the invention. For example, the radii of the surfaces of each lens element and the axial distance between each adjacent surfaces may be changed as long as the above conditions are satisfied. Such other embodiments and variants are intended to be covered by the following claims.

What is claimed is:

1. An f·θ lens for an optical scanning system including a deflection means, comprising a first meniscus element of positive power having a concave object side surface, a second element of negative power having a sharp object side surface, a third element of positive power having a sharp image side surface and a fourth element arranged in order from the object end to the image end, and satisfying the following conditions:

$$-0.5 < f_{23}/f < -0.30$$

$$0.91 < r_2/r_3 < 1.06$$

$$-0.28 < f_2/f < -0.17$$

where f is the focal length of said entire f·θ lens;

$f_2$ is the focal length of said second element;

$f_{23}$ is the overall focal length of said second element; and said third elements;

$r_2$ is the radius of an image side surface of said first element; and $r_3$ is the radius of an object side surface of said second element.

2. An f·θ lens as defined in claim 1, further satisfying the following conditions:

$$0.37 < f_3/f < 0.71$$

$$0.34 < f_4/f < 0.52$$

where $f_3$ is the focal length of the third element; and $f_4$ is the focal length of the fourth element.

3. An f·θ lens as defined in claim 1, described substantially as follows:

| | Radius of Curvature (mm) | Axial Distance Between Surfaces (mm) | N |
|---|---|---|---|
| L1 | R1 −15.65 | D1 2.042 | 1.77861 |
| | R2 −13.672 | D2 1.699 | |
| L2 | R3 −13.586 | D3 1.497 | 1.73540 |
| | R4 −167.609 | D4 0.345 | |
| L3 | R5 −88.21 | D5 2.993 | 1.51509 |
| | R6 −22.811 | D6 0.068 | |
| L4 | R7 −247.214 | D7 4.082 | 1.79861 |
| | R8 −28.127 | | | where the reference L followed by an arabic numeral indicates the lens element progressively from the object end to the image end of the lens, the reference radius numbers R are the progressive lens surface radii in millimeter (mm), the reference distance numbers D are the progressive axial distances between adjacent surfaces in millimeter (mm), and N is the index of refraction of the lens element for a spectrum of wavelength 632.8 nm.

4. An f·θ lens as defined in claim 1, described substantially as follows:

| | Radius of Curvature | Axial Distance Between Surfaces | N |
|---|---|---|---|
| L1 | R1 −15.147 | D1 2.041 | 1.77861 |
| | R2 −13.534 | D2 2.09 | |
| L2 | R3 −13.471 | D3 1.497 | 1.75606 |
| | R4 −171.501 | D4 0.238 | |
| L3 | R5 −95.355 | D5 2.993 | 1.51509 |
| | R6 −21.965 | D6 0.068 | |
| L4 | R7 −222.199 | D7 3.810 | 1.77861 |
| | R8 −26.868 | | | where the reference L followed by an arabic numeral indicates the lens element progressively from the object end to the image end of the lens, the reference radius numbers R are the progressive lens surface radii in millimeter (mm), the reference distance numbers D are the progressive axial distances between adjacent surfaces in millimeter (mm), and N is the index of refraction of the lens element for a spectrum of wavelength 632.8 nm.

5. An f·θ lens as defined in claim 1, described substantially as follows:

|  | Radius of Curvature | Axial Distance Between Surfaces | N |
|---|---|---|---|
| L1 | R1 −14.917 | D1 2.013 | 1.77861 |
|  | R2 −13.502 | D2 2.416 |  |
| L2 | R3 −13.369 | D3 1.477 | 1.75606 |
|  | R4 −166.969 | D4 0.191 |  |
| L3 | R5 −101.642 | D5 2.953 | 1.51509 |
|  | R6 −21.683 | D6 0.067 |  |
| L4 | R7 −183.656 | D7 3.739 | 1.77861 |
|  | R8 −26.004 |  |  | where the reference L followed by an arabic numeral indicates the lens element progressively from the object end to the image end of the lens, the reference radius numbers R are the progressive lens surface radii in millimeter (mm), the reference distance numbers D are the progressive axial distances between adjacent surfaces in millimeter (mm), and N is the index of refraction of the lens element for a spectrum of wavelength 632.8 nm.

6. An f·θ lens as defined in claim 1, described substantially as follows:

|  | Radius of Curvature | Axial Distance Between Surfaces | N |
|---|---|---|---|
| L1 | R1 −16.249 | D1 2.196 | 1.61824 |
|  | R2 −14.524 | D2 2.835 |  |
| L2 | R3 −14.721 | D3 2.175 | 1.63604 |
|  | R4 −253.662 | D4 0.544 |  |
| L3 | R5 −73.844 | D5 3.435 | 1.61824 |
|  | R6 −26.140 | D6 0.116 |  |
| L4 | R7 1277.93 | D7 4.082 | 1.61824 |
|  | R8 −29.963 |  |  | where the reference L followed by an arabic numeral indicates the lens element progressively from the object end to the image end of the lens, the reference radius numbers R are the progressive lens surface radii in millimeter (mm), the reference distance numbers D are the progressive axial distances between adjacent surfaces in millimeter (mm), and N is the index of refraction of the lens element for a spectrum of wavelength 632.8 nm.

7. An f·θ lens as defined in claim 1, described substantially as follows:

|  | Radius of Curvature | Axial Distance Between Surfaces | N |
|---|---|---|---|
| L1 | R1 −13.931 | D1 2.083 | 1.77861 |
|  | R2 −13.001 | D2 2.366 |  |
| L2 | R3 −13.503 | D3 1.366 | 1.69426 |
|  | R4 689.93 | D4 0.0 |  |
| L3 | R5 689.93 | D5 3.399 | 1.51509 |
|  | R6 −21.826 | D6 0.078 |  |
| L4 | R7 −170.442 | D7 2.934 | 1.77816 |
|  | R8 −28.456 |  |  | where the reference L followed by an arabic numeral indicates the lens element progressively from the object end to the image end of the lens, the reference radius numbers R are the progressive lens surface radii in millimeter (mm), the reference distance numbers D are the progressive axial distances between adjacent surfaces in millimeter (mm), and N is the index of refraction of the lens element for a spectrum of wavelength 632.8 nm.

\* \* \* \* \*